United States Patent
Propheter-Hinckley

(10) Patent No.: US 10,809,154 B1
(45) Date of Patent: Oct. 20, 2020

(54) METHOD OF TESTING FLOW IN AN AIRFOIL BY APPLYING PLUGS TO INTERNAL INLET ORIFICES

(71) Applicant: United Technologies Corporation, Farmington, CT (US)

(72) Inventor: Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 178 days.

(21) Appl. No.: 16/202,136

(22) Filed: Nov. 28, 2018

(51) Int. Cl.
G01M 15/02 (2006.01)
G01M 15/14 (2006.01)
F01D 9/04 (2006.01)
F01D 5/18 (2006.01)

(52) U.S. Cl.
CPC .......... G01M 15/02 (2013.01); G01M 15/14 (2013.01); *F01D 5/187* (2013.01); *F01D 9/041* (2013.01); *F05D 2260/83* (2013.01)

(58) Field of Classification Search
CPC ....... G01M 15/02; G01M 15/14; F01D 5/187; F01D 9/041; F05D 2210/30; F05D 2260/83; F05D 2260/12; F05D 2260/80
See application file for complete search history.

(56) References Cited

U.S. PATENT DOCUMENTS

| 5,358,029 | A | * | 10/1994 | Baveja | B22C 7/02 164/122.1 |
|---|---|---|---|---|---|
| 5,726,348 | A | | 3/1998 | Draghi et al. | |
| 7,685,870 | B2 | | 3/2010 | Quinn et al. | |
| 7,971,473 | B1 | * | 7/2011 | Meunier | G01M 15/14 73/112.01 |
| 8,438,915 | B2 | | 5/2013 | McCall et al. | |
| 8,534,122 | B2 | | 9/2013 | Mironets et al. | |
| 8,650,940 | B2 | * | 2/2014 | Howard | F01D 25/285 73/112.01 |
| 9,188,504 | B2 | * | 11/2015 | Bezdecny | G01M 13/00 |
| 9,470,605 | B2 | * | 10/2016 | Koonankeil | G01M 15/14 |
| 9,518,469 | B2 | * | 12/2016 | Tibbott | F01D 5/186 |
| 9,702,817 | B2 | * | 7/2017 | Worth | G01N 21/53 |
| 2012/0171045 | A1 | | 7/2012 | Spangler et al. | |

* cited by examiner

*Primary Examiner* — Freddie Kirkland, III
(74) *Attorney, Agent, or Firm* — Carlson, Gaskey & Olds, P.C.

(57) ABSTRACT

A method of testing flow in an airfoil includes isolating a first cooling passage network of the airfoil by applying plugs to internal inlet orifices of the other ones of the cooling passage networks in the airfoil. The plugs block flow from an internal core cavity of the airfoil into the other ones of the cooling passage networks. The inlet orifices of the first cooling passage network are left open. A test flow is then applied to the internal core cavity and flows through the inlet orifices of the first cooling passage network.

20 Claims, 4 Drawing Sheets

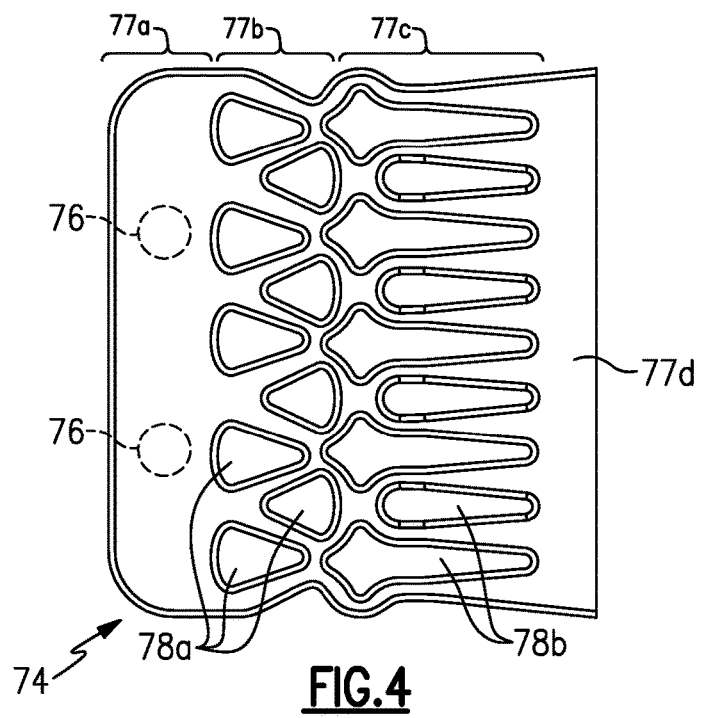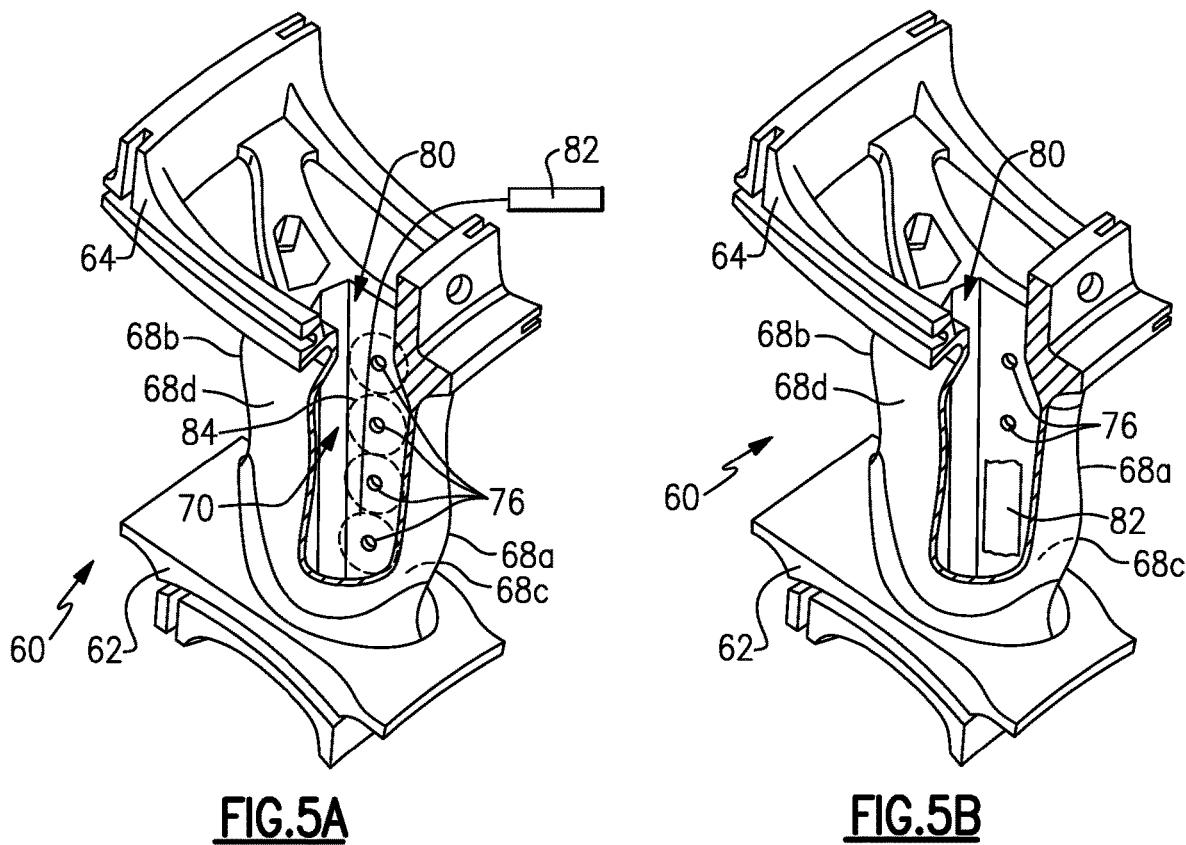

METHOD OF TESTING FLOW IN AN AIRFOIL BY APPLYING PLUGS TO INTERNAL INLET ORIFICES

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A method of testing flow in an airfoil according to an example of the present disclosure includes providing an airfoil that has an airfoil wall that defines leading and trailing ends and first and second sides that join the leading and trailing ends. The airfoil wall circumscribes an internal core cavity, and there are a plurality of cooling passage networks embedded in the airfoil wall between inner and outer portions of the airfoil wall. Each cooling passage network has one or more inlet orifices through the inner portion of the airfoil wall that opens to the internal core cavity, a sub-passage region that includes an array of pedestals, and at least one outlet orifice through the outer portion of the airfoil wall. In the method, a first one of the cooling passage networks is isolated for flow testing by applying plugs to the inlet orifices of the other ones of the cooling passage networks. The plugs block flow from the internal core cavity into the other ones of the cooling passage networks. The one or more inlet orifices of the first one of the cooling passage networks are left open. A test flow is then applied to the internal core cavity. The test flow flows through the one or more inlet orifices of the first one of the cooling passage networks.

In a further embodiment of any of the forgoing embodiments, the plugs are adhesive tapes.

A further embodiment of any of the forgoing embodiments additionally includes removing the adhesive tapes using a solvent to dissolve the adhesive tapes.

In a further embodiment of any of the forgoing embodiments, the plugs are elastomer boots.

In a further embodiment of any of the forgoing embodiments, the elastomer boots are silicone.

In a further embodiment of any of the forgoing embodiments, the plugs are wax.

A further embodiment of any of the forgoing embodiments additionally includes removing the wax using a solvent to dissolve the wax.

A further embodiment of any of the forgoing embodiments additionally includes removing the wax by thermal volatilization of the wax.

In a further embodiment of any of the forgoing embodiments, the airfoil includes a platform from which the airfoil wall extends, the platform including an opening that opens into the internal core cavity, and the applying of the plugs includes inserting the plugs through the opening and onto the inlet orifices of the other ones of the cooling passage networks.

A further embodiment of any of the forgoing embodiments additionally includes, after the applying of the test flow, isolating a second one of the cooling passage networks for flow testing by removing a portion of the plugs, followed by applying plugs to the one or more inlet orifices of the first one of the cooling passage networks, and then re-applying the test flow to the internal core cavity, the test flow flowing through the one or more inlet orifices of the second one of the cooling passage networks.

In a further embodiment of any of the forgoing embodiments, the plugs are selected from the group consisting of elastomer boots, wax, adhesive tape, and combinations thereof.

A method of testing flow in an airfoil according to an example of the present disclosure includes providing an airfoil and isolating a first one of the cooling passage networks for flow testing by inserting plugs through the opening into the internal core cavity and applying the plugs to the inlet orifices of the other ones of the cooling passage networks. The plugs block flow from the internal core cavity into the other ones of the cooling passage networks. The one or more inlet orifices of the first one of the cooling passage networks are left open. A test flow is then applied to the internal core cavity. The test flow flows through the one or more inlet orifices of the first one of the cooling passage networks.

In a further embodiment of any of the forgoing embodiments, the plugs are adhesive tapes.

A further embodiment of any of the forgoing embodiments additionally includes removing the adhesive tapes using a solvent to dissolve the adhesive tapes.

In a further embodiment of any of the forgoing embodiments, the plugs are elastomer boots.

In a further embodiment of any of the forgoing embodiments, the elastomer boots are silicone.

In a further embodiment of any of the forgoing embodiments, the plugs are wax.

A further embodiment of any of the forgoing embodiments additionally includes removing the wax using a solvent to dissolve the wax.

A further embodiment of any of the forgoing embodiments additionally includes removing the wax by thermal volatilization of the wax.

A further embodiment of any of the forgoing embodiments additionally includes, after the applying of the test flow, isolating a second one of the cooling passage networks for flow testing by removing a portion of the plugs, followed by applying plugs to the one or more inlet orifices of the first one of the cooling passage networks, and then re-applying the test flow to the internal core cavity, the test flow flowing through the one or more inlet orifices of the second one of the cooling passage networks.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 illustrates a cooling passage network of the airfoil of FIG. 2A.

FIG. 5A illustrates a partial cutaway view of the airfoil of FIG. 2A depicting insertion of a plug.

FIG. 5B illustrates the plug covering an inlet orifice of a cooling passage network.

DETAILED DESCRIPTION

Figure 1:
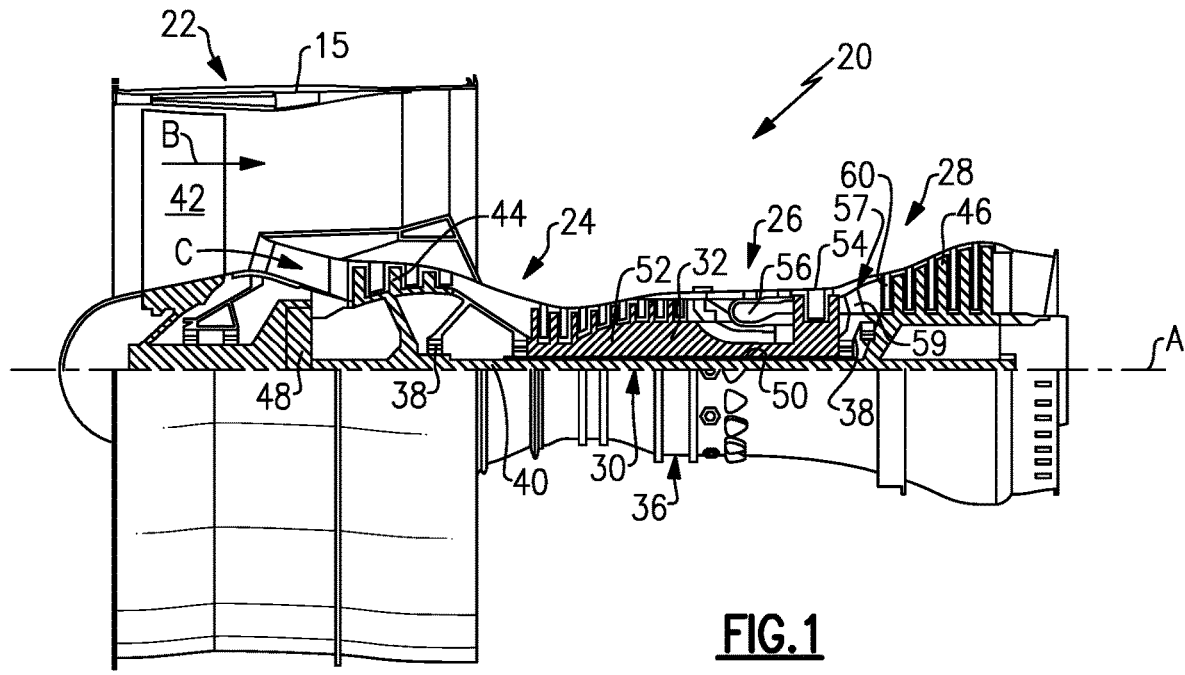
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2A:
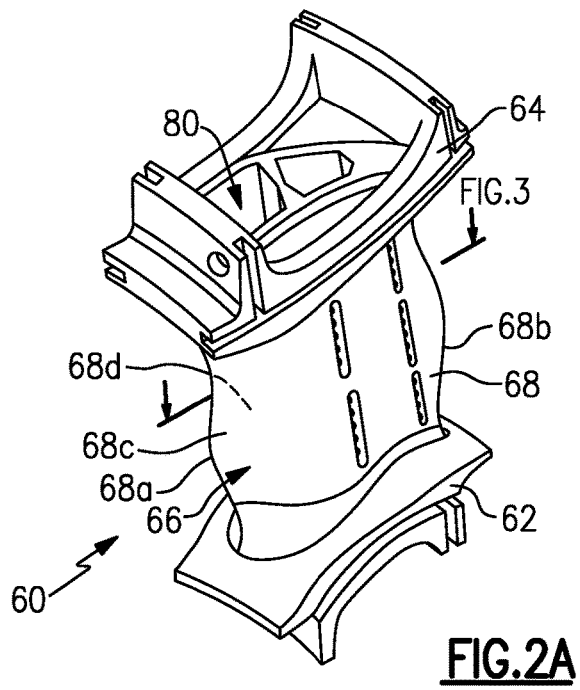
FIG. 2A illustrates a turbine airfoil of the engine of FIG. 1.
Figure 2B:
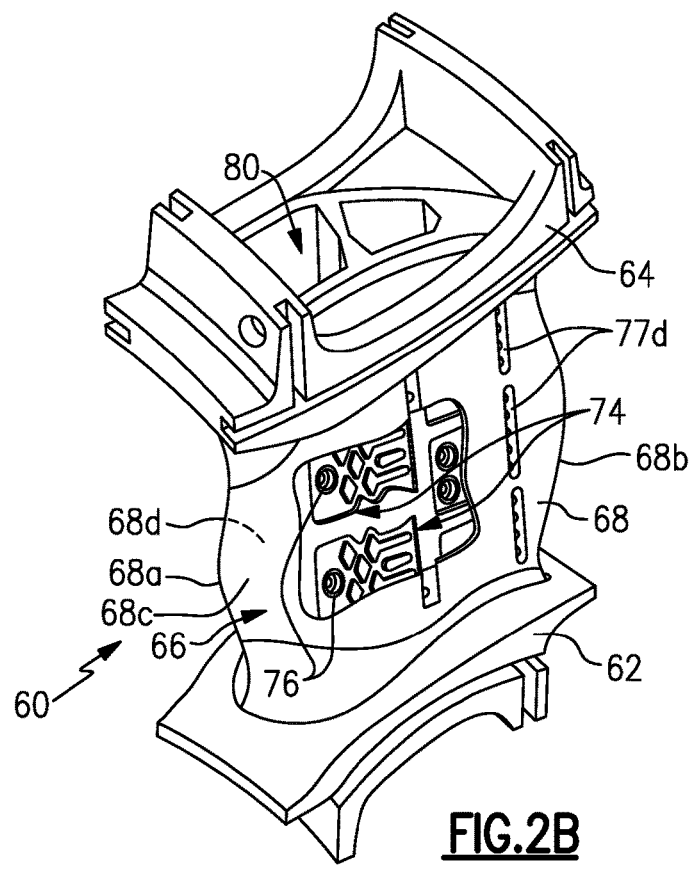
FIG. 2B illustrates a partial cutaway view of the airfoil of FIG. 2A.
Figure 3:
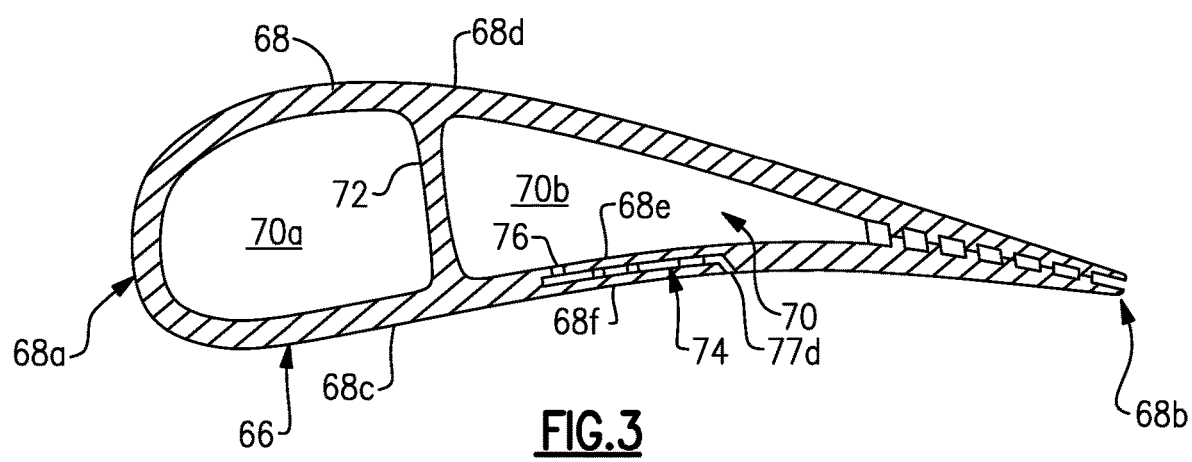
FIG. 3 illustrates a sectioned view of the airfoil of FIG. 2A.

FIG. 2A illustrates a representative example of a turbine airfoil 60 used in the turbine engine 20 (see also FIG. 1), FIG. 2B illustrates a partial cutaway view of the airfoil 60, and FIG. 3 illustrates a sectioned view of the airfoil 60. As shown, the turbine airfoil 60 is a turbine vane; however, it is to be understood that, although the examples herein may be described with reference to the turbine vane, this disclosure is also applicable to turbine blades and blade outer air seals.

The airfoil 60 includes a first or inner platform 62, a second or outer platform 64, and an airfoil section 66 that spans between the inner and outer platforms 62/64. The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. In this example, the first side 68c is a pressure side and the second side 68d is a suction side. The outer wall 68 circumscribes an internal core cavity 70, which in this example is partitioned by a rib 72 into a forward core cavity 70a and an aft core cavity 70b. As will be appreciated, there may alternatively be only a single core cavity or there may be additional ribs to partition additional core cavities.

There is at least one cooling passage network 74 embedded in the airfoil outer wall 68 between inner and outer portions 68e/68f of the airfoil wall 68. For example, as shown (FIG. 3), one or more of the cooling passage networks 74 is embedded in the first side 68c of the outer wall 68, although one or more networks 74 could additionally or alternatively be embedded in the second side 68d. The cooling passage networks 74 may also be referred to as minicores or minicore passages. A "minicore" or "minicore passage" is a reference to the small investment casting core that is typically used to make such an embedded passage, as opposed to a main core that is used to form a main or central core cavity in an airfoil.

FIG. 4 shows an "inverse" or negative view of a representative one of the cooling passage networks 74. The inverse view is also representative of an investment core that may be used in an investment casting process to form the network 74 in the airfoil 60. Most typically, the investment casting core is injection molded from a material that contains ceramic or metal alloy. The investment core is shaped to form the cooling passage network 74. In the inverse view, solid structures of the investment core produce void structures in the cooling passage network 74 and void structures of the investment core produce solid structures in the cooling passage network 74. Thus, the investment core has the negative of the structural features of the cooling passage network 74.

The cooling passage network 74 includes at least one inlet orifice 76 through the inner portion 68e of the airfoil outer wall 68 (FIG. 3) to receive cooling air from the internal core cavity 70. Most typically, the network 74 will include two inlet orifices 76. A single, exclusive inlet orifice 76 is also contemplated, as well as more than two inlet orifices 78, although fabrication may be challenging.

The inlet orifices 76 open into a radially-elongated manifold region 77a (see FIG. 4), which serves to distribute the cooling air to a downstream sub-passage region 77b, which then leads into an exit region 77c that feeds into one or more outlet orifices 77d through the outer portion 68f of the airfoil wall 68.

The region 77b includes an array of pedestals 78a. The pedestals 78a are arranged in radially staggered rows. The pedestals 78a define sub-passages between adjacent pedestals 78. In this example, the exit region 77c includes a plurality of flow guides 78b. For instance, the flow guides 78b have a teardrop shape and facilitate straightening and guiding flow into the one or more outlet orifices 77c.

In general, the inlet orifices 76 of the network 74 are located forward of the one or more outlet orifices 77d. One of the inlet orifices 76 is located in the radially upper half of the manifold region 77a and the other of the inlet orifices 76 is in the radially lower half of the manifold region 77a. Most typically, the radially upper and lower halves of the 74 are mirror images, i.e., symmetric relative to the midline of the network 74 between the two inlet orifices 76.

In this example, the airfoil 60 includes five networks 74 that each independently receives cooling air, such as bleed air from the compressor section 24, during engine operation. The cooling air is fed through an opening 80 in the platform 64 (or alternatively though the platform 62). The opening 80 opens to the internal core cavity 70. The cooling air flows from the internal core cavity 70 through the inlet orifices 76 into the respective networks 74. Within each network 74, the manifold region 77a distributes the cooling air to the sub-passage region 77b. The cooling air flows between the pedestals 78a, which mix the cooling air and enhance cooling. The cooling air then flows into the exit region 77c and is expelled from the airfoil 60 through the one or more outlet orifices 77d into the core gaspath.

The networks 74 may be tested prior to use in the engine 20, either as a quality check during initial manufacturing of the airfoil 60 or in connection with a repair process of the airfoil 60, to ensure that the networks 74 are operating properly and are free of obstructions. In this regard, each network 74 can be fluidly isolated from the other networks 74 and then a test flow can be circulated through the isolated network 74 to determine whether that network 74 is operating properly. However, to fluidly isolate one of the networks 74, flow through the other networks 74 must be closed. This can be accomplished by blocking the outlet orifices 77d of the networks 74 that are not being tested. However, blocking the outlet orifices 77d can be tedious and time-consuming because the curved surface profile near the outlet orifices 77d makes application of blocking devices difficult and the relatively close proximity of the outlet orifices 77d to each other requires precise application of the blocking devices to avoid partially covering an orifice 77d that should be open.

An alternative disclosed herein is to instead block the inlet orifices 76. Most typically, blocking an orifice from the inside of an airfoil is unfeasible because the orifice is not accessible from inside the airfoil without major reconstruction of the airfoil or without destroying the airfoil. In the airfoil 60, however, the opening 80 in the platform 64 provides access, such as line-of-sight access, from the exterior of the airfoil 60 to the inlet orifices 76. Thus, an operator can access the inlet orifices 76 manually or with minimal simple tools—without destroying the airfoil 60 or having to perform airfoil reconstruction.

As a further example, as shown in FIGS. 5A and 5B, one or more plugs 82 can be inserted through the opening 80 and into the internal core cavity 70 to apply the plugs 82 to the inlet orifices 76. In this regard, the regions 84 (in dashed lines) around the inlet orifices 76 are relatively flat and smooth, which can facilitate application of the plugs 82. Moreover, while the outlet orifices 77d are elongated and relative close together, the inlet orifices 76 spaced relatively far apart, further facilitating application of the plugs 82. Thus, a user can apply the plugs 82 to the inlet orifices 76 of the networks that are to be blocked, while leaving the inlet orifices 76 of the network 74 that is to be flow tested open. The plugs 82 block flow from the internal core cavity 70 into those networks 74, thereby fluidly isolating one of the networks 74 for testing.

The airfoil 60 can then be mounted in a test fixture and a metered flow of air (or other gas or other fluid) can be provided from an air source into the internal core cavity 70. The air flows through the open inlet orifices 76 and respective network 74 and exits through the one or more outlet orifices 77d of that network 74. Various parameters related to the air flow can be measured to determine whether the network 74 is operating properly, such as but not limited to, a pressure ratio between the pressure of air provided into the internal core passage 70 and the pressure of the air from the one or more outlet orifices 77*d*. For instance, if the measured pressure ratio is non-conforming with a predetermined pressure ratio range, the non-conforming pressure ratio may be indicative that the network 74 is faulty (e.g., obstructed, malformed, etc.). Such parameters, measuring techniques, test fixtures, and fault determinations are well understood and are not discussed further herein.

Figure 6:
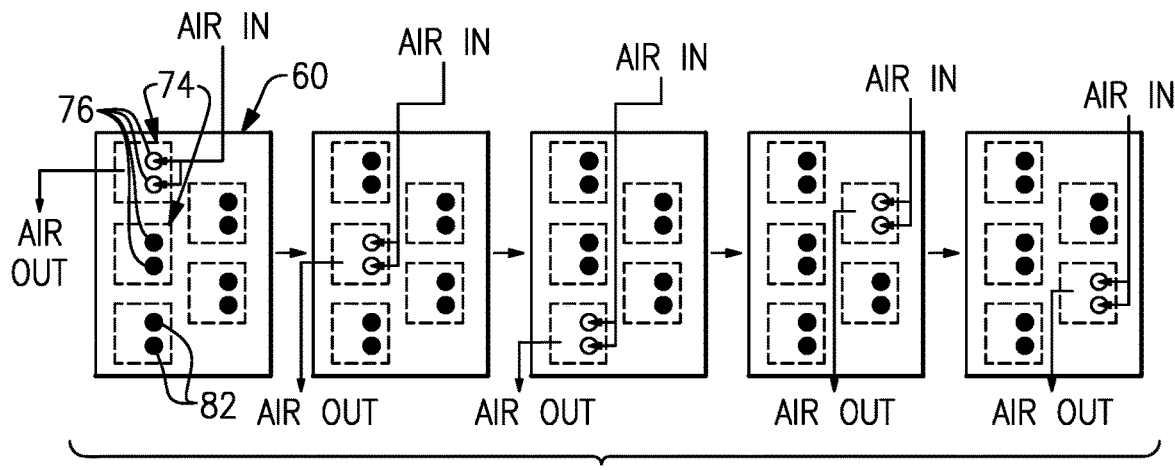
FIG. 6 illustrates a progressive flow testing of a plurality of cooling passage networks.

As depicted in FIG. 6, the networks 74 can be tested progressively, one-by-one, by applying plugs 82 (closed, dark circles) to the inlet orifices 76 of all but one of the networks 74 (open, light circles), testing flow of that network 74, removing the plugs 82 from a next or second one of the networks 74, applying plugs 82 to the inlet orifices 76 of the earlier-tested network 74, testing flow of the next network 74, and then repeating this process until each network 74 has been tested.

Figure 7:
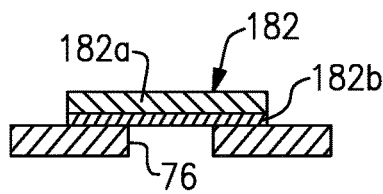
FIG. 7 illustrates an adhesive tape type plug.
Figure 8:
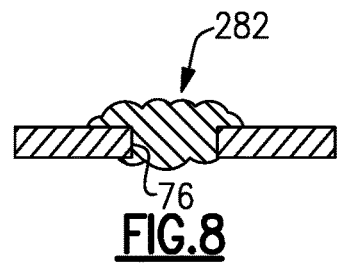
FIG. 8 illustrates a wax body type of plug.
Figure 9:
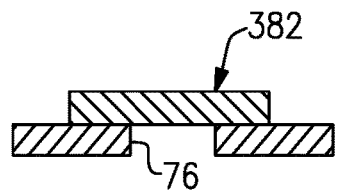
FIG. 9 illustrates an elastomer boot type plug.

FIGS. 7, 8, and 9 illustrate representative examples of different types of plugs that may be used. The example plugs may be readily applied and removed, to facilitate rapid flow testing. In FIG. 7 the plug 182 is an adhesive tape that includes a backing layer 182*a* and an adhesive layer 182*b*. As an example, the adhesive tape may be masking tape, but is not limited thereto. The backing layer 182*a* is substantially non-porous and airtight. For example, the backing layer 182*a* may be a polymer layer. The adhesive tape plug 182 can be applied manually, via insertion through the opening 80, over one or more of the inlet orifices 76. For instance, a single piece of the adhesive tape can be applied to cover a single inlet orifice 76, both or all of the inlet orifices 76 of a single network 74, or the inlet orifices 76 of multiple networks 74.

In FIG. 8 the plug 282 is a moldable body. The moldable body plug 282 can initially be liquid or semi-solid and can be manually applied, via insertion through the opening 80, to the inlet orifices 76. As an example, the moldable body plug 282 may be polymer wax, bees wax, or soft metal such a silver, but is not limited thereto. The moldable body 282 may cover over the inlet orifice 76 and/or may penetrate into the inlet orifice 76 to block airflow. A single moldable body plug 282 can be applied to cover a single inlet orifice 76, both or all the inlet orifices 76 of a single network 74, or inlet orifices 76 of multiple networks 74. After or during application, the moldable body may solidify, thereby lodging in or on the inlet orifice 76.

In FIG. 9 the plug 382 is an elastomer boot. For example, the elastomer boot plug 382 is formed of silicone or other flexible elastomer. The elastomer boot plug 382 can be manually applied, via insertion through the opening 80, over the inlet orifice 76. A single elastomer boot plug 382 can be applied to cover a single inlet orifice 76, both or all the inlet orifices 76 of a single network 74, or inlet orifices 76 of multiple networks 74. The elastomer boot plug 382 may include an adhesive or may be non-adhesive. If non-adhesive, the elastomer boot plug 382 may be pressed onto the inlet orifice and suction force, wedging, or kinematic leverage may hold the elastomer boot plug 382 in place.

Figure 10:
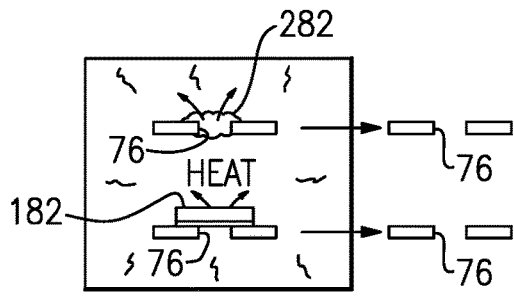
FIG. 10 illustrates thermal removal of an adhesive tape plug or a wax body plug.

The elastomer boot plug 382 may be removed manually by peeling the elastomer boot plug 382 off of the inlet orifice 76. The adhesive tape plug 182 and moldable body plug 282 may be removed by peeling but more typically will be removed thermally and/or chemically. As an example, FIG. 10 depicts thermal removal in a heating chamber. It is to be understood that although the adhesive tape plug 182 and moldable body plug 282 are both shown, that each type of plug may be processed separately at its own appropriate temperature. The airfoil is heated in the heating chamber to a temperature above the thermal degradation temperature of either the adhesive tape plug 182 or the moldable body plug 282. The adhesive tape plug 182 or the moldable body plug 282 volatilizes and is removed by a carrier gas flowing in the heating chamber. In this instance, the thermal removal removes all of the adhesive tape plugs 182 or all of the moldable body plugs 282 and new plugs 182 or 282 may need to be applied if further flow testing is to be conducted.

Figure 11:
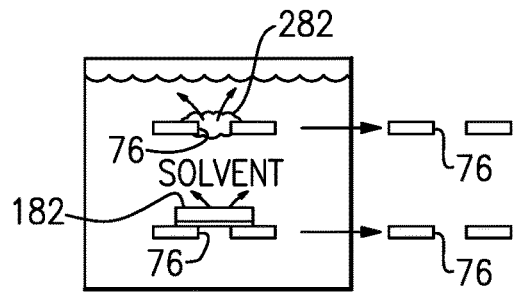
FIG. 11 illustrates chemical removal of an adhesive tape plug or a wax body plug.

FIG. 11 depicts chemical removal. Again, it is to be understood that although the adhesive tape plug 182 and moldable body plug 282 are both shown, that each may be processed separately in its own appropriate solvent or solvents. The airfoil is exposed to a solvent or solvents in which the adhesive tape plug 182 or the moldable body plug 282 is soluble. The adhesive tape plug 182 or the moldable body plug 282 dissolves in the solvent or solvents and is thereby removed. In this instance, the chemical removal removes all of the adhesive tape plugs 182 or all of the moldable body plugs 282 and new plugs 182 or 282 may need to be applied if further flow testing is to be conducted.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of testing flow in an airfoil, the method comprising:
   providing an airfoil that has an airfoil wall that defines leading and trailing ends and first and second sides that join the leading and trailing ends, the airfoil wall circumscribes an internal core cavity, and a plurality of cooling passage networks embedded in the airfoil wall between inner and outer portions of the airfoil wall, each said cooling passage network has one or more inlet orifices through the inner portion of the airfoil wall that opens to the internal core cavity, a sub-passage region that includes an array of pedestals, and at least one outlet orifice through the outer portion of the airfoil wall;
   isolating a first one of the cooling passage networks for flow testing by applying plugs to the inlet orifices of the other ones of the cooling passage networks, the plugs blocking flow from the internal core cavity into the other ones of the cooling passage networks, wherein the one or more inlet orifices of the first one of the cooling passage networks are left open; and
   applying a test flow to the internal core cavity, the test flow flowing through the one or more inlet orifices of the first one of the cooling passage networks.

2. The method as recited in claim 1, wherein the plugs are adhesive tapes.

3. The method as recited in claim 2, further comprising removing the adhesive tapes using a solvent to dissolve the adhesive tapes.

4. The method as recited in claim 1, wherein the plugs are elastomer boots.

5. The method as recited in claim 4, wherein the elastomer boots are silicone.

6. The method as recited in claim 1, wherein the plugs are wax.

7. The method as recited in claim 6, further comprising removing the wax using a solvent to dissolve the wax.

8. The method as recited in claim 6, further comprising removing the wax by thermal volatilization of the wax.

9. The method as recited in claim 1, wherein the airfoil includes a platform from which the airfoil wall extends, the platform including an opening that opens into the internal core cavity, and the applying of the plugs includes inserting the plugs through the opening and onto the inlet orifices of the other ones of the cooling passage networks.

10. The method as recited in claim 1, further comprising, after the applying of the test flow, isolating a second one of the cooling passage networks for flow testing by removing a portion of the plugs, followed by applying plugs to the one or more inlet orifices of the first one of the cooling passage networks, and then re-applying the test flow to the internal core cavity, the test flow flowing through the one or more inlet orifices of the second one of the cooling passage networks.

11. The method as recited in claim 1, wherein the plugs are selected from the group consisting of elastomer boots, wax, adhesive tape, and combinations thereof.

12. A method of testing flow in an airfoil, the method comprising:
 providing an airfoil that has a platform and an airfoil wall that extends from the platform, the airfoil wall defines leading and trailing ends and first and second sides that join the leading and trailing ends, the airfoil wall circumscribes an internal core cavity, and a plurality of cooling passage networks are embedded in the airfoil wall between inner and outer portions of the airfoil wall, each said cooling passage network has one or more inlet orifices through the inner portion of the airfoil wall that opens to the internal core cavity, a sub-passage region that includes an array of pedestals, and at least one outlet orifice through the outer portion of the airfoil wall, and the platform includes an opening that opens into the internal core cavity;
 isolating a first one of the cooling passage networks for flow testing by inserting plugs through the opening into the internal core cavity and applying the plugs to the inlet orifices of the other ones of the cooling passage networks, the plugs blocking flow from the internal core cavity into the other ones of the cooling passage networks, wherein the one or more inlet orifices of the first one of the cooling passage networks are left open; and
 applying a test flow to the internal core cavity, the test flow flowing through the one or more inlet orifices of the first one of the cooling passage networks.

13. The method as recited in claim 12, wherein the plugs are adhesive tapes.

14. The method as recited in claim 13, further comprising removing the adhesive tapes using a solvent to dissolve the adhesive tapes.

15. The method as recited in claim 12, wherein the plugs are elastomer boots.

16. The method as recited in claim 15, wherein the elastomer boots are silicone.

17. The method as recited in claim 12, wherein the plugs are wax.

18. The method as recited in claim 17, further comprising removing the wax using a solvent to dissolve the wax.

19. The method as recited in claim 17, further comprising removing the wax by thermal volatilization of the wax.

20. The method as recited in claim 12, further comprising, after the applying of the test flow, isolating a second one of the cooling passage networks for flow testing by removing a portion of the plugs, followed by applying plugs to the one or more inlet orifices of the first one of the cooling passage networks, and then re-applying the test flow to the internal core cavity, the test flow flowing through the one or more inlet orifices of the second one of the cooling passage networks.

* * * * *